United States Patent
Ichikawa et al.

(10) Patent No.: US 12,151,216 B2
(45) Date of Patent: Nov. 26, 2024

(54) ZEOLITE MEMBRANE COMPOSITE, METHOD OF PRODUCING ZEOLITE MEMBRANE COMPOSITE, AND SEPARATION METHOD

(71) Applicant: NGK INSULATORS, LTD., Nagoya (JP)

(72) Inventors: Makiko Ichikawa, Nagoya (JP); Kenji Yajima, Nagoya (JP); Makoto Miyahara, Tajimi (JP); Naoto Kinoshita, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 586 days.

(21) Appl. No.: 17/305,184

(22) Filed: Jul. 1, 2021

(65) Prior Publication Data
US 2021/0322932 A1 Oct. 21, 2021

Related U.S. Application Data

(63) Continuation of application No. PCT/JP2020/006209, filed on Feb. 18, 2020.

(30) Foreign Application Priority Data

Mar. 4, 2019 (JP) .................. 2019-038444

(51) Int. Cl.
*B01D 71/02* (2006.01)
*B01D 53/22* (2006.01)
(Continued)

(52) U.S. Cl.
CPC ....... *B01D 71/0281* (2022.08); *B01D 53/228* (2013.01); *B01D 67/0051* (2013.01);
(Continued)

(58) Field of Classification Search
None
See application file for complete search history.

(56) References Cited

U.S. PATENT DOCUMENTS 10,995,008 B2 * 5/2021 Kalo .................. B01J 37/06
2003/0089227 A1 * 5/2003 Hasse ................ B01D 69/145
95/45

(Continued)

FOREIGN PATENT DOCUMENTS

JP H10-057784 A1 3/1998
JP 2005-262189 A1 9/2005
(Continued)

OTHER PUBLICATIONS

JP2016174996A_ENG (Espacenet machine translation of Matsukata) (Year: 2016).*

(Continued)

*Primary Examiner* — Gabriel E Gitman
(74) *Attorney, Agent, or Firm* — BURR PATENT LAW, PLLC

(57) ABSTRACT

A zeolite membrane composite includes a porous support and a zeolite membrane formed on the support. The zeolite membrane includes a low-density layer that covers the support, and a compact layer that covers the low-density layer. The compact layer has a higher content of a zeolite crystalline phase than the low-density layer. By in this way forming the compact layer on the low-density layer that covers the support, the thin compact layer with no defects can be formed more easily than in the case where a compact layer is formed directly on a support.

14 Claims, 4 Drawing Sheets

(51) Int. Cl.
   *B01D 67/00* (2006.01)
   *B01D 69/02* (2006.01)
   *B01D 69/10* (2006.01)
   *B01D 69/12* (2006.01)

(52) U.S. Cl.
   CPC ........... *B01D 69/02* (2013.01); *B01D 69/108* (2022.08); *B01D 69/1213* (2022.08); *B01D 2256/245* (2013.01); *B01D 2257/504* (2013.01); *B01D 2323/12* (2013.01); *B01D 2325/023* (2013.01); *B01D 2325/04* (2013.01); *B01D 2325/20* (2013.01)

(56) References Cited

U.S. PATENT DOCUMENTS

| | | | | |
|---|---|---|---|---|
| 2004/0116275 | A1* | 6/2004 | Benfer | B01J 20/183 502/4 |
| 2017/0189862 | A1 | 7/2017 | Imasaka et al. | |
| 2018/0369746 | A1* | 12/2018 | Hayashi | B01D 53/22 |
| 2019/0001278 | A1 | 1/2019 | Miyahara et al. | |
| 2020/0001250 | A1 | 1/2020 | Miyahara et al. | |
| 2020/0030753 | A1 | 1/2020 | Hagio et al. | |

FOREIGN PATENT DOCUMENTS

| | | | |
|---|---|---|---|
| JP | 2016174996 | A * | 10/2016 |
| JP | 2018158304 | A * | 10/2018 |
| WO | 2012/046545 | A1 | 4/2012 |
| WO | 2017/169591 | A1 | 10/2017 |
| WO | 2018/180243 | A1 | 10/2018 |
| WO | 2018/180563 | A1 | 10/2018 |

OTHER PUBLICATIONS

JP2018158304A_ENG (Espacenet machine translation of Itoi) (Year: 2018).*
English translation of the International Preliminary Report on Patentability (Chapter I) dated Sep. 16, 2021 (Application No. PCT/JP2020/006209).
International Search Report and Written Opinion (Application No. PCT/JP2020/006209) dated Apr. 7, 2020.
United Arab Emirates Office Action dated Dec. 26, 2023 (Application No. P6001406/2021).

* cited by examiner

ZEOLITE MEMBRANE COMPOSITE, METHOD OF PRODUCING ZEOLITE MEMBRANE COMPOSITE, AND SEPARATION METHOD

CROSS-REFERENCE TO RELATED APPLICATION

The present application is a continuation application of International Application No. PCT/JP2020/006209 filed on Feb. 18, 2020, which claims the benefit of priority to Japanese Patent Application No. 2019-038444 filed on Mar. 4, 2019. The entire contents of these applications are incorporated herein by reference.

TECHNICAL FIELD

The present invention relates to a zeolite membrane composite, a method of producing the zeolite membrane composite, and a separation method for a mixture of substances with use of the zeolite membrane composite.

BACKGROUND ART

Various studies and developments are currently underway on forming a zeolite membrane on a porous support to obtain a zeolite membrane composite and using the molecular-sieving function of the zeolite in applications such as separation or adsorption of specific molecules. For example, in the separation of a mixed gas including a plurality of types of gases, the mixed gas is supplied to a zeolite membrane composite, and a gas with high permeability is caused to permeate through the zeolite membrane composite so as to be separated from the other gases.

For example, Japanese Patent Application Laid-Open No. H10-57784 (Document 1) proposes a zeolite separation membrane in which a compact zeolite membrane with a thickness of 0.5 μm to 30 μm is in tight contact with the surface of a porous base material. The porous base material has a porosity of 10% to 50% and a mean pore diameter of 0.5 μm to 10 μm. The zeolite membrane is formed by depositing seed crystals by an amount of 0.2 mg/cm$^2$ to 3 mg/cm$^2$ on the surface of the porous base material and then hydrothermally synthesizing the seed crystals in a starting material solution, the seed crystals having an average grain diameter that is 0.4 to 8 times the mean pore diameter of the porous base material.

In Document 1, a cross section of a zeolite separation membrane according to a conventional technique is disclosed in FIG. 2. In this zeolite separation membrane, a sparse zeolite layer with a bridge structure (i.e., large voids) is provided between a base material and a compact layer. Document 1 describes that the sparse zeolite layer is inferior in usage resistance because it does not cover the surface of the base material in portions including the bridge structure and therefore has low strength. It is also described that this zeolite separation membrane has problems of a large membrane thickness and a low permeation flux.

Incidentally, in order to efficiently separate a high-permeability gas from the other gases in a zeolite membrane composite, it is necessary to form a compact zeolite membrane with no defects on a porous support. Moreover, in order to improve permeance of the high-permeability gas, it is necessary to reduce the thickness of the zeolite membrane. However, if the zeolite membrane is reduced in thickness, defects will be more likely to occur in the zeolite membrane. Therefore, it is not easy for a zeolite membrane composite to achieve both high permeability and high selectivity.

SUMMARY OF INVENTION

The present invention is intended for a zeolite membrane composite, and it is an object of the present invention to achieve a zeolite membrane composite with high permeability and high selectivity.

A zeolite membrane composite according to one preferable embodiment of the present invention includes a porous support, and a zeolite membrane formed on the support. The zeolite membrane includes a low-density layer that covers the support, and a compact layer that covers the low-density layer and has a higher content of a zeolite crystalline phase than the low-density layer. According to the present invention, it is possible to achieve a zeolite membrane composite with high permeability and high selectivity.

Preferably, the compact layer contains zeolite crystals with an average particle diameter greater than an average particle diameter of zeolite crystals contained in the low-density layer.

More preferably, the average particle diameter of the zeolite crystals contained in the compact layer is 100 times or less the average particle diameter of the zeolite crystals contained in the low-density layer.

Preferably, the compact layer contains zeolite crystals with an average particle diameter greater than or equal to 0.1 μm and less than or equal to 10 μm.

Preferably, the compact layer has a thickness that is 0.05 times or more and 50 times or less a thickness of the low-density layer.

Preferably, the content of the zeolite crystalline phase in the compact layer is higher than or equal to 95%, and a content of a zeolite crystalline phase in the low-density layer is higher than or equal to 5% and lower than 95%.

Preferably, the low-density layer has a grain boundary phase formed of an inorganic compound.

Preferably, the low-density layer has a grain boundary phase including an amorphous phase.

Preferably, the compact layer and the low-density layer contain zeolite crystals of the same type.

Preferably, the compact layer contains zeolite crystals having a maximum number of 8-membered rings.

The present invention is also intended for a method of producing the zeolite membrane composite. A method of producing the zeolite membrane composite according to one preferable embodiment of the present invention includes a) preparing seed crystals, b) depositing the seed crystals on a porous support to form a seed crystal laminate on the support, the seed crystal laminate including a lamination of two or more layers of the seed crystals, and c) immersing the support in a starting material solution to grow a zeolite from the seed crystal laminate by hydrothermal synthesis and to form a zeolite membrane on the support. The zeolite membrane includes a low-density layer that covers the support, and a compact layer that covers the low-density layer and has a higher content of a zeolite crystalline phase than the low-density layer. According to the present invention, it is possible to achieve a zeolite membrane composite with high permeability and high selectivity.

Preferably, a molar ratio of a structure-directing agent to water in the starting material solution is less than or equal to 0.01.

The present invention is also intended for a separation method. A separation method according to one preferable embodiment of the present invention includes a) preparing the zeolite membrane composite according to any one of claims 1 to 10, and b) supplying a mixture of substances that includes a plurality of types of gases or liquids to the zeolite membrane composite and causing a substance with high permeability in the mixture of substances to permeate through the zeolite membrane composite to separate the substance with high permeability from other substances Preferably, the mixture of substances includes at least one of substances selected from a group consisting of hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

These and other objects, features, aspects and advantages of the present invention will become more apparent from the following detailed description of the present invention when taken in conjunction with the accompanying drawings.

DESCRIPTION OF EMBODIMENTS

Figure 1:
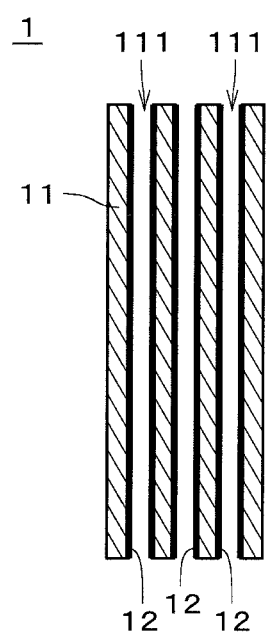
FIG. 1 is a sectional view of a zeolite membrane composite.
Figure 2:
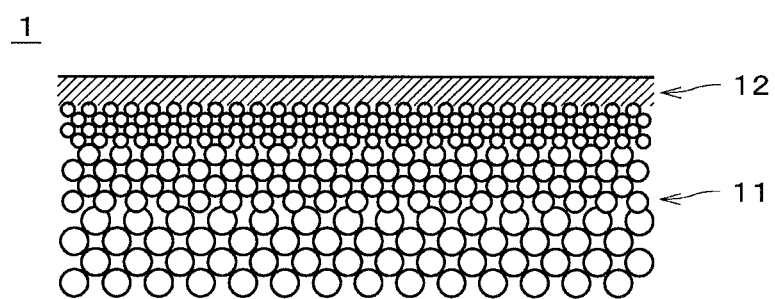
FIG. 2 is a sectional view of part of the zeolite membrane composite in enlarged dimensions.

FIG. 1 is a sectional view of a zeolite membrane composite 1. FIG. 2 is a sectional view of part of the zeolite membrane composite 1 in enlarged dimensions. The zeolite membrane composite 1 includes a porous support 11 and a zeolite membrane 12 formed on the support 11. The zeolite membrane 12 refers to at least a zeolite formed into a membrane on the surface of the support 11, and does not include zeolite particles that are merely dispersed in an organic membrane. In FIG. 1, the zeolite membrane 12 is illustrated with bold lines. In FIG. 2, the zeolite membrane 12 is cross-hatched. In the illustration of FIG. 2, the zeolite membrane 12 has a thickness greater than an actual thickness.

The support 11 is a porous member permeable to gases and liquids. In the example illustrated in FIG. 1, the support 11 is a monolith support in which a plurality of through holes 111, each extending in a longitudinal direction (i.e., an up-down direction in FIG. 1), are provided in an integrally-molded column-like body. In the example illustrated in FIG. 1, the support 11 has a substantially column-like shape. Each through hole 111 (i.e., cell) has, for example, a substantially circular cross-sectional shape perpendicular to the longitudinal direction. In the illustration of FIG. 1, the through holes 111 have a diameter greater than an actual diameter, and the number of through holes 111 is smaller than an actual number. The zeolite membrane 12 is formed on the inner surfaces of the through holes 111 and covers substantially the entire inner surfaces of the through holes 111.

The support 11 has a length (i.e., length in the up-down direction in FIG. 1) of, for example, 10 cm to 200 cm. The support 11 has an outer diameter of, for example, 0.5 cm to 30 cm. The distance between the central axes of each pair of adjacent through holes 111 is, for example, in the range of 0.3 mm to 10 mm. The surface roughness (Ra) of the support 11 is, for example, in the range of 0.1 μm to 5.0 μm and preferably in the range of 0.2 μm to 2.0 μm. Alternatively, the support 11 may have a different shape such as a honeycomb shape, a flat plate-like shape, a tube-like shape, a cylinder-like shape, a column-like shape, or a polygonal prism shape. When the support 11 has a tube- or cylinder-like shape, the thickness of the support 11 is, for example, in the range of 0.1 mm to 10 mm.

As the material for the support 11, various substances (e.g., ceramic or metal) may be employed as long as they have chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttrium, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass frit, clay minerals, and easily sinterable cordierite.

The support 11 has a mean pore diameter of, for example, 0.01 μm to 70 μm and preferably 0.05 μm to 25 μm. The mean pore diameter of the support 11 in the vicinity of the surface on which the zeolite membrane 12 is formed is in the range of 0.01 μm to 1 μm and preferably in the range of 0.05 μm to 0.5 μm. As to a pore size distribution of the support 11 as a whole that includes the surface and inside of the support 11, D5 is in the range of, for example, 0.01 μm to 50 μm, D50 is in the range of, for example, 0.05 μm to 70 μm, and D95 is in the range of, for example, 0.1 μm to 2000 μm. The porosity of the support 11 in the vicinity of the surface on which the zeolite membrane 12 is formed is in the range of, for example, 20% to 50%.

For example, the support 11 has a multilayer structure in which a plurality of layers with different mean pore diameters are laminated one above another in a thickness direction. A surface layer that includes the surface on which the zeolite membrane 12 is formed has a smaller mean pore diameter and a smaller sintered particle diameter than the other layers. The mean pore diameter in the surface layer of the support 11 is, for example, in the range of 0.01 μm to 1 μm and preferably in the range of 0.05 μm to 0.5 μm. When the support 11 has a multilayer structure, the material for each layer may be any of the materials described above. The plurality of layers forming the multilayer structure may be formed of the same material, or may be formed of different materials.

The zeolite membrane 12 is a porous membrane with small pores. The zeolite membrane 12 can be used as a separation membrane that separates a specific substance from a mixture of substances including a plurality of types of substances, using a molecular sieving function. The zeolite membrane 12 is less permeable to the other substances than to the specific substance. In other words, the permeance of the other substances through the zeolite membrane 12 is lower than the permeance of the specific substance described above through the zeolite membrane 12.

The zeolite membrane 12 has a thickness of, for example, 0.05 μm to 30 μm, preferably 0.1 μm to 20 μm, and more preferably 0.5 μm to 10 μm. Increasing the thickness of the zeolite membrane 12 improves selectivity. Reducing the thickness of the zeolite membrane 12 improves permeance. The surface roughness (Ra) of the zeolite membrane 12 is, for example, less than or equal to 5 μm, preferably less than or equal to 2 μm, more preferably less than or equal to 1 μm, and yet more preferably less than or equal to 0.5 μm. The zeolite membrane 12 has a mean pore diameter less than or equal to 1 nm.

The mean pore diameter of the zeolite membrane 12 is preferably greater than or equal to 0.2 nm and less than or equal to 0.8 nm, more preferably greater than or equal to 0.3 nm and less than or equal to 0.7 nm, and yet more preferably greater than or equal to 0.3 nm and less than or equal to 0.6 nm. The mean pore diameter of the zeolite membrane 12 is smaller than the mean pore diameter of the support 11 in the vicinity of the surface on which the zeolite membrane 12 is formed.

When n is a maximum number of membered rings in a zeolite constituting the zeolite membrane 12, an arithmetical mean of the major and minor axes of an n-membered ring pore is assumed to be the mean pore diameter. The n-membered ring pore refers to a small pore having n oxygen atoms in a portion in which the oxygen atoms are bonded together with T atoms to form a ring structure. When the zeolite has a plurality of n-membered ring pores where n is the same number, an arithmetical mean of the major and minor axes of all of the n-membered ring pores is assumed to be the mean pore diameter of the zeolite. In this way, the mean pore diameter of the zeolite membrane is uniquely determined by the framework structure of the zeolite and can be obtained from a value presented in the "Database of Zeolite Structures" [online] by the International Zeolite Association on the Internet (www.iza-structure.org/databases/).

There are no particular limitations on the type of the zeolite constituting the zeolite membrane 12, and for example, the zeolite may be of any of the following types: AEI-type, AEN-type, AFN-type, AFV-type, AFX-type, BEA-type, CHA-type, DDR-type, ERI-type, ETL-type, FAU-type (X-type, Y-type), GIS-type, LEV-type, LTA-type, MEL-type, MFI-type, MOR-type, PAU-type, RHO-type, SAT-type, and SOD-type.

Examples of the zeolite constituting the zeolite membrane 12 include a zeolite in which atoms located in the center of an oxygen tetrahedron ($TO_4$) constituting the zeolite (T atoms) are composed of Si and Al, an AlPO-type zeolite in which the T atoms are composed of Al and P, an SAPO-type zeolite in which the T atoms are composed of Si, Al, and P, an MAPSO-type zeolite in which the T atoms are composed of magnesium (Mg), Si, Al, and P, and a ZnAPSO-type zeolite in which the T atoms are composed of zinc (Zn), Si, Al, and P. Some of the T atoms may be replaced by other elements.

The zeolite membrane 12 contains, for example, silicon (Si). For example, the zeolite membrane 12 may contain any two or more of Si, aluminum (Al), and phosphorus (P). The zeolite membrane 12 may contain alkali metal. The alkali metal may, for example, be sodium (Na) or potassium (K). When the zeolite membrane 12 contains Si atoms, the Si/Al ratio in the zeolite membrane 12 is, for example, higher than or equal to 1 and lower than or equal to 100,000. The Si/Al ratio is preferably higher than or equal to 5, more preferably higher than or equal to 20, and yet more preferably hither than or equal to 100, and is preferably as high as possible. The Si/Al ratio in the zeolite membrane 12 may be adjusted by adjusting a composition ratio of an Si source to an Al source in a starting material solution, which will be described later.

From the viewpoint of improving $CO_2$ permeance and selectivity, the zeolite preferably has a maximum number of 8-membered rings or less (e.g., 6 or 8). For example, the zeolite membrane 12 may be composed of a DDR-type zeolite. In other words, the zeolite membrane 12 is a zeolite membrane composed of a zeolite having a framework type code "DDR" assigned by the International Zeolite Association. In this case, the zeolite constituting the zeolite membrane 12 has an intrinsic pore diameter of 0.36 nm×0.44 nm and a mean pore diameter of 0.40 nm.

The $CO_2$ permeance of the zeolite membrane 12 at a temperature of 20° C. to 400° C. may, for example, be higher than or equal to 100 nmol/$m^2$·s·Pa. A ratio (permeance ratio) between $CO_2$ permeance and $CH_4$ permeance (leakage) of the zeolite membrane 12 at a temperature of 20° C. to 400° C. may, for example, be higher than or equal to 100. The $CO_2$ permeance and the permeance ratio are values for the case where there is a difference of 1.5 MPa in partial pressure of $CO_2$ between the supply side and permeation side of the zeolite membrane 12.

Figure 3:
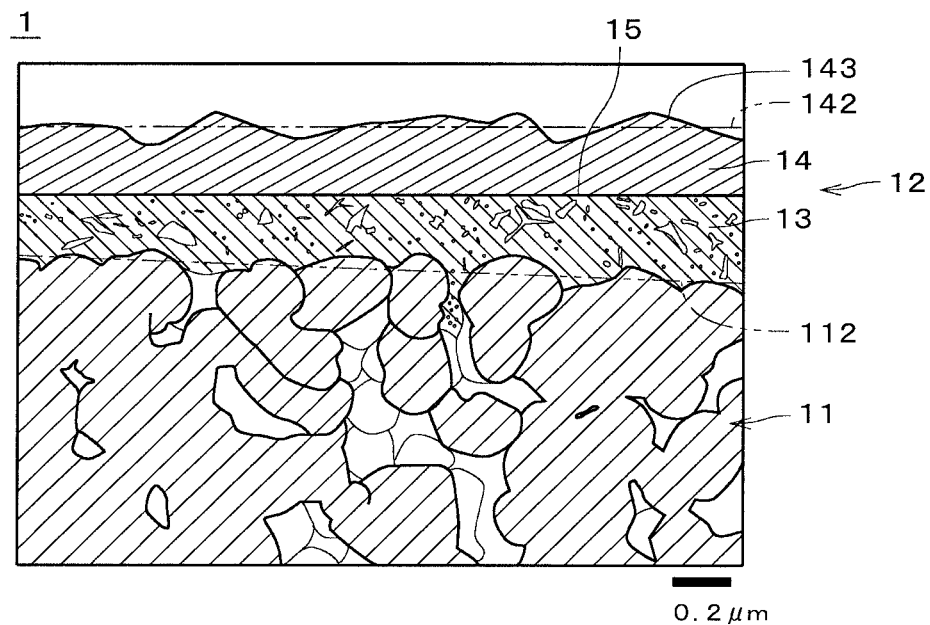
FIG. 3 is an illustration of an STEM image of part of the zeolite membrane composite in enlarged dimensions.

FIG. 3 is an illustration (i.e., STEM image) obtained by observing a ground surface in cross-section of the zeolite membrane composite 1 in the vicinity of the zeolite membrane 12 with a scanning transmission electron microscope (STEM).

The zeolite membrane 12 includes a low-density layer 13 and a compact layer 14. The low-density layer 13 is in direct contact with the surface of the support 11 and covers the surface of the support 11. The compact layer 14 is in direct contact with the surface of the low-density layer 13 and covers the surface of the low-density layer 13. The compact layer 14 is not in direct contact with the surface of the support 11, but is indirectly in contact with the surface of the support 11 via the low-density layer 13. The compact layer 14 has a higher content of a zeolite crystalline phase than the low-density layer 13. In FIG. 3, an interface between the compact layer 14 and the low-density layer 13 (i.e., the surface of the low-density layer 13) is indicated by a solid line 15.

The content of the zeolite crystalline phase in the compact layer 14 is preferably higher than or equal to 95% and more preferably higher than or equal to 96%. The content of a zeolite crystalline phase in the low-density layer 13 is preferably higher than or equal to 5% and lower than 95% and more preferably higher than or equal to 20% and lower than or equal to 90%. The content of the zeolite crystalline phase in the compact layer 14 is obtained by dividing the volume of the zeolite crystalline phase in the compact layer 14 by a total volume of the zeolite crystalline phase and a grain boundary phase in the compact layer 14. The content of the zeolite crystalline phase in the low-density layer 13 is also obtained in the same manner.

The aforementioned grain boundary phase is a region between a plurality of zeolite crystals. For example, the grain boundary phase may be a phase that includes non-crystalline (i.e., amorphous), crystals other than zeolite crystals and/or voids. The grain boundary phase has a density lower than the density of the zeolite crystalline phase.

The content of the zeolite crystalline phase in the compact layer 14 is obtained using the aforementioned STEM image. Specifically, in the STEM image, one arbitrary zeolite crystal is selected, and a region that includes grain boundary phases between the selected zeolite crystal and all zeolite crystals adjacent thereto is selected. Then, this region is binarized using a predetermined threshold value. The threshold value is determined appropriately so as to enable the recognition of the selected zeolite crystal and the grain boundary phases. Next, the area of portions having concentrations lower than the threshold value (e.g., zeolite crystalline phase) and the area of portions having concentrations higher than or equal to the threshold value (e.g., grain boundary phase) are obtained based on the binarized image of the above region. Then, the content of the zeolite crystalline phase in this region is obtained by dividing the area of the zeolite crystalline phase by a total area of the zeolite crystalline phase and the grain boundary phase. In the present embodiment, the content of the zeolite crystalline phase is obtained for each of 10 regions of the compact layer 14 in the STEM image, and an average of these contents is regarded as the content of the zeolite crystalline phase in the compact layer 14. The content of the zeolite crystalline phase in the low-density layer 13 is also obtained in the same manner as that in the compact layer 14.

The grain boundary phases in the low-density layer 13 preferably include an amorphous phase. More preferably, the grain boundary phases in the low-density layer 13 include 10% or more by weight of an amorphous phase. The grain boundary phases in the low-density layer 13 are preferably formed of inorganic compounds. In other words, the grain boundary phases in the low-density layer 13 are preferably formed of only inorganic compounds and substantially do not include any organic compound. The language "substantially do not include any organic compound" refers to not including 5% or more by weight of organic compounds.

The interface 15 between the compact layer 14 and the low-density layer 13 is obtained using the aforementioned STEM image. Specifically, first, an approximate surface 142 is obtained in the STEM image by linear approximation of a surface 143 of the compact layer 14 (i.e., the outer surface on the side opposite to the interface 15) using least squares. In FIG. 3, the approximate surface 142 of the compact layer 14 is indicated by a chain double-dashed line. Then, a plurality of straight lines (not shown) parallel to the approximate surface 142 are arranged at regular intervals in a direction perpendicular to the approximate surface 142 (i.e., a downward direction in FIG. 3). The interval between the straight lines is a distance that is sufficiently smaller than the thickness of the compact layer 14.

Next, for each of the straight lines that do not include the background of the STEM image, the proportion of the grain boundary phases on the straight line (i.e., the occupancy of the grain boundary phases) is obtained. Then, a straight line that is parallel to the approximate surface 142 and located at midpoint between two straight lines in a direction away from the approximate surface 142 is determined as the interface 15, one of the two straight lines being a straight line on which the proportion of the grain boundary phases first becomes or exceeds 5%, and the other straight line being located adjacent to the one of the two straight lines on the side of the approximate surface 142.

The thickness of the compact layer 14 is obtained as a distance between the approximate surface 142 and the interface 15 in the direction perpendicular to the approximate surface 142 of the compact layer 14. The thickness of the low-density layer 13 is obtained as an average distance between the interface 15 and an approximate surface 112 of the support 11 in the direction perpendicular to the approximate surface 142 of the compact layer 14. In FIG. 3, the approximate surface 112 of the support 11 is indicated by a chain double-dashed line. The approximate surface 112 of the support 11 is obtained by linear approximation of the surface of the support 11, using least squares in the aforementioned STEM image. The average distance between the interface 15 and the approximate surface 112 of the support 11 refers to an arithmetic mean of the distances between the interface 15 and the approximate surface 112 of the support 11 at positions in the right-left direction of the STEM image (i.e., the right-left direction in FIG. 3). The thickness of the zeolite membrane 12 is equal to a total of the thickness of the compact layer 14 and the thickness of the low-density layer 13. Note that the STEM image used to obtain the thicknesses of the compact layer 14 and the low-density layer 13 is acquired such that the total thickness of the zeolite membrane 12 and the support 11 becomes approximately three times the thickness of the zeolite membrane 12 and that the width of the zeolite membrane 12 in the right-left direction becomes approximately four times the thickness of the zeolite membrane 12.

As described above, the thickness of the zeolite membrane 12 is, for example, in the range of 0.05 μm to 30 μm, preferably in the range of 0.1 μm to 20 μm, and more preferably in the range of 0.5 μm to 10 μm. The thickness of the compact layer 14 is, for example, in the range of 0.01 μm to 20 μm, preferably in the range of 0.03 μm to 10 μm, and more preferably in the range of 0.05 μm to 8 μm. The thickness of the low-density layer 13 is, for example, in the range of 0.01 μm to 20 μm, preferably in the range of 0.05 μm to 10 μm, and more preferably in the range of 0.1 μm to 5 μm. The thickness of the compact layer 14 is preferably greater than or equal to 0.05 times and less than or equal to 50 times the thickness of the low-density layer 13, and more preferably greater than or equal to 0.1 times and less than or equal to 30 times the thickness of the low-density layer 13.

In the zeolite membrane 12, the compact layer 14 and the low-density layer 13 contain zeolite crystals of the same type. In the example in FIG. 3, the compact layer 14 and the low-density layer 13 each primarily contain zeolite crystals of one type, and the zeolite crystals contained in the compact layer 14 and the zeolite crystals contained in the low-density layer 13 are of the same type. The zeolite crystals contained in the compact layer 14 and the low-density layer 13 are formed of, for example, a DDR-type zeolite. The compact layer 14 contains zeolite crystals having a maximum number of 8-membered rings. The low-density layer 13 also contains zeolite crystals having a maximum number of 8-membered rings. The zeolite crystals contained in the compact layer 14 and the low-density layer 13 have inherit pore diameters of 0.36 nm×0.44 nm.

Figure 4:
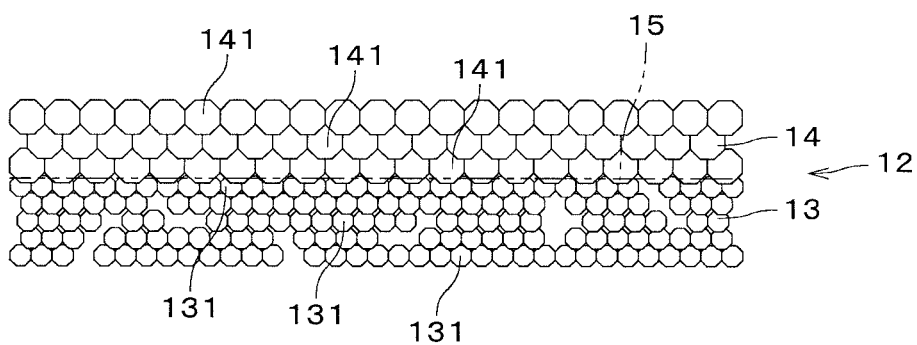
FIG. 4 is a schematic diagram illustrating the vicinity of an interface between a compact layer and a low-density layer in enlarged dimensions.

FIG. 4 is a schematic diagram illustrating the vicinity of the interface 15 between the compact layer 14 and the low-density layer 13 of the zeolite membrane 12 in enlarged dimensions. As illustrated in FIG. 4, zeolite crystals 141 contained in the compact layer 14 have an average particle diameter greater than the average particle diameter of zeolite crystals 131 contained in the low-density layer 13. In the illustration of FIG. 4, the zeolite crystals 141 contained in the compact layer 14 are of the same size, but the zeolite crystals 141 may be of different sizes. In the illustration, the zeolite crystals 131 contained in the low-density layer 13 are of the same size, but the zeolite crystals 131 may also be of different sizes.

The average particle diameter of the zeolite crystals 141 contained in the compact layer 14 is preferably 100 times or less the average particle diameter of the zeolite crystals 131 contained in the low-density layer 13, and more preferably 80 times or less the average particle diameter of the zeolite crystals 131. The average particle diameter of the zeolite crystals 141 contained in the compact layer 14 is also preferably twice or more the average particle diameter of the zeolite crystals 131, and more preferably three time or more the average particle diameter of the zeolite crystals 131. The average particle diameter of the zeolite crystals 141 contained in the compact layer 14 is preferably greater than or equal to 0.01 μm and less than or equal to 10 μm, and more preferably greater than or equal to 0.03 μm and less than or equal to 5 μm. The average particle diameter of the zeolite crystals 131 contained in the low-density layer 13 is preferably greater than or equal to 0.01 μm and less than or equal to 10 μm and more preferably greater than or equal to 0.05 μm and less than or equal to 5 μm.

The average particle diameter of the zeolite crystals 141 contained in the compact layer 14 is calculated by capturing an image of the surface of the zeolite membrane 12 with a scanning electron microscope (SEM) to select a range of 15 μm×15 μm, calculating the number of zeolite crystals 141 included in the image and the area of the zeolite crystals 141, and then dividing the area of the zeolite crystals 141 by the number of the zeolite crystals 141 on the assumption that the zeolite crystals 141 have circular shapes. The average particle diameter of the zeolite crystals 131 contained in the low-density layer 13 is calculated from a cross-sectional STEM image that includes the zeolite membrane 12 and the support 11. Specifically, the average particle diameter of the zeolite crystals 131 is calculated by selecting, in the cross-sectional image, a screen of an area within a distance at which the zeolite membrane 12 and the support 11 have an equal thickness in the direction of thickness of the zeolite membrane 12, calculating the number of zeolite crystals 131 included in the image and the area of the zeolite crystals 131 after binarization using aforementioned method, and dividing the area of the zeolite crystals 131 by the number of the zeolite crystals 131 on the assumption that the zeolite crystals 131 have circular shapes.

Figure 5:
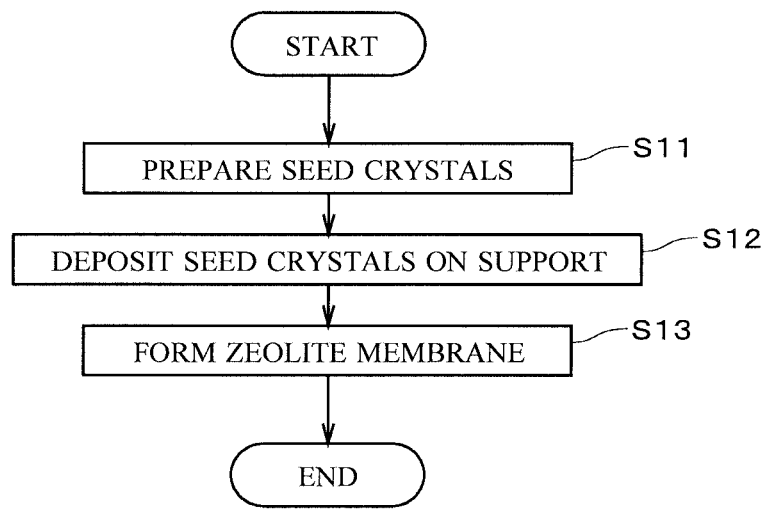
FIG. 5 is a flowchart of a procedure for producing the zeolite membrane composite.

Next, one example of a procedure for producing the zeolite membrane composite 1 will be described with reference to FIG. 5. In the production of the zeolite membrane composite 1, first, seed crystals for use in the production of the zeolite membrane 12 are prepared (step S11). For example, the seed crystals are acquired from DDR-type zeolite powder synthesized by hydrothermal synthesis. This zeolite powder may be used as-is as seed crystals, or may be processed into seed crystals by pulverization or other methods.

Figure 6:
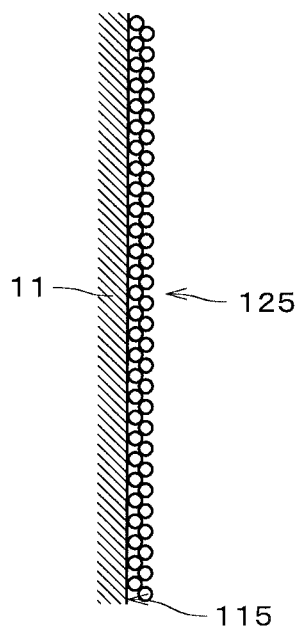
FIG. 6 is a sectional view illustrating part of the zeolite membrane composite during production in enlarged dimensions.

Then, the seed crystals are deposited on the support 11 (step S12). In step S12, a seed crystal laminate 125 that includes a lamination of two or more layers of seed crystals is formed on the inner surfaces 115 of the through holes 111 in the support 11 as illustrated in FIG. 6. In this way, a seed-crystal-deposited support is prepared. In the illustration of FIG. 6, the seed crystals are circular in shape and larger than an actual size.

In the example illustrated in FIG. 6, the seed crystal laminate 125 includes a first seed crystal layer and a second seed crystal layer, the first seed crystal layer being in direct contact with the inner surfaces 115 of the support 11 and covering the inner surfaces 15, and the second seed crystal layer being in direct contact with the surface of the first seed crystal layer and covering the surface of the first seed crystal layer. The second seed crystal layer is not in direct contact with the inner surfaces 115 of the support 11, but is indirectly in contact with the inner surfaces 115 of the support 11 via the first seed crystal layer. Preferably, the seed crystal laminate 125, the first seed crystal layer, and the s second seed crystal layer each have a substantially uniform thickness on the support 11. The seed crystal laminate 125 may further include another seed crystal layer laminated on the second seed crystal layer.

The deposition of the seed crystal laminate 125 on the support 11 in step S12 is implemented by immersing the porous support 11 in a solution in which the seed crystals are dispersed. In this case, in order to form the seed crystal laminate 125 on the support 11, the immersion of the support 11 in the solution and drying of the support 11 may be repeated a plurality of times. Alternatively, the deposition of the seed crystal laminate 125 on the support 11 may be implemented by bringing a solution with the seed crystals dispersed therein into contact with the inner surfaces 115 of the through holes 111 of the support 11. As another alternative, the seed crystal laminate 125 may be deposited on the support 11 by other techniques.

The support 11 with the seed crystal laminate 125 despotized thereon is immersed in a starting material solution. The starting material solution is prepared by, for example, dissolving components such as an Si source and a structure-directing agent (hereinafter, also referred to as an "SDA") in a solvent. For example, the starting material solution has a composition of $1.0SiO_2$: $0.015SDA$; $0.12$ $(CH_2)_2(NH_2)_2$. The solvent in the starting material solution may, for example, be water or alcohol such as ethanol. When water is used as the solvent of the starting material solution, the molar ratio of the SDA to the water contained in the starting material solution is preferably lower than or equal to 0.01. The molar ratio of the SDA to the water contained in the starting material solution is also preferably higher than or equal to 0.00001. The SDA contained in the starting material solution may, for example, be an organic compound. For example, 1-adamantanamine may be used as the SDA.

Then, the zeolite membrane 12 of a DDR-type is formed on the support 11 by growing a DDR-type zeolite by hydrothermal synthesis using various crystals of the aforementioned seed crystal laminate 125 as nuclei (step S13). The hydrothermal synthesis temperature is preferably in the range of 120 to 200° C. and may, for example, be 160° C. The hydrothermal synthesis time is preferably in the range of 10 to 100 hours and may, for example, be 30 hours.

After the hydrothermal synthesis is completed, the support 11 and the zeolite membrane 12 are rinsed with deionized water. After the rinsing, the support 11 and the zeolite membrane 12 are dried at, for example, 80° C. After the support 11 and the zeolite membrane 12 have been dried, the zeolite membrane 12 is subjected to heat treatment so as to almost completely burn and remove the SDA in the zeolite membrane 12 and to cause micropores in the zeolite membrane 12 to come through the membrane. In this way, the aforementioned zeolite membrane composite 1 is obtained.

Figure 7:
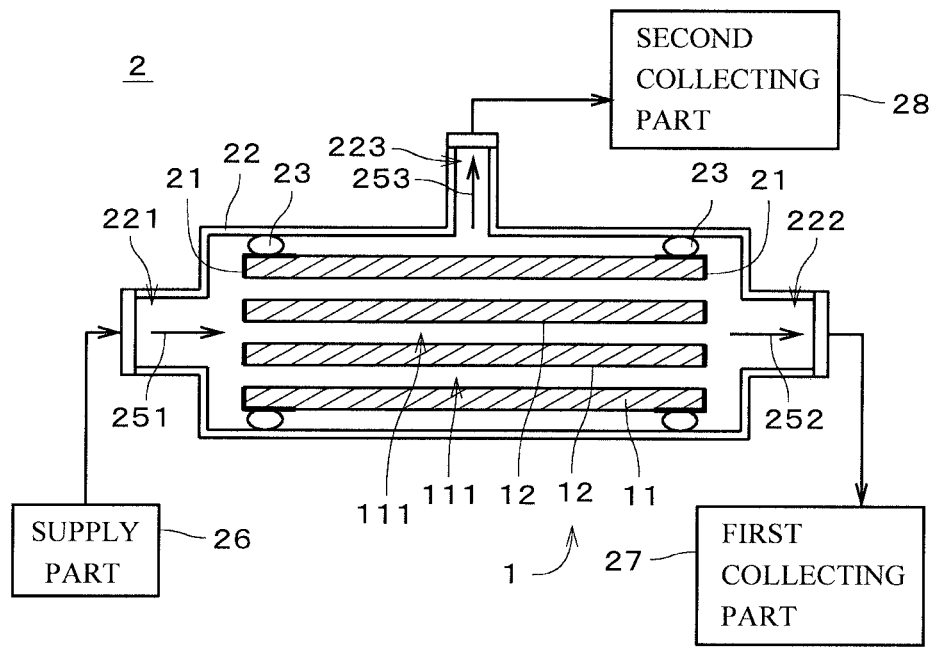
FIG. 7 is an illustration of a separator.
Figure 8:
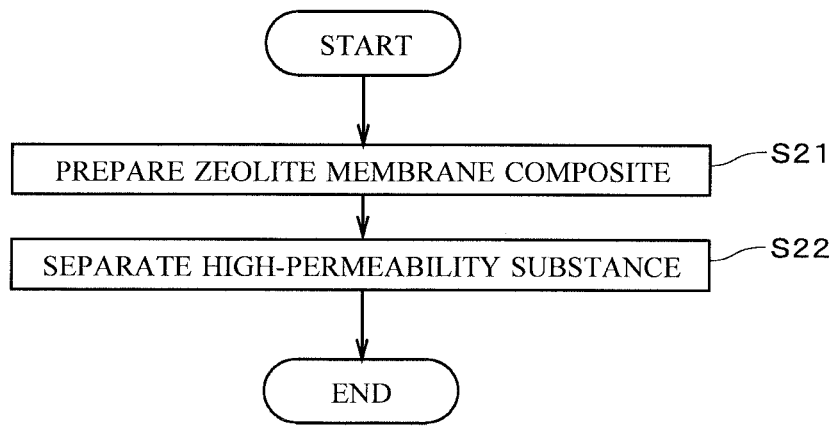
FIG. 8 is a flowchart of a procedure for separation of a mixture of substances.

Next, the separation of a mixture of substances using the zeolite membrane composite 1 will be described with reference to FIGS. 7 and 8. FIG. 7 is an illustration of a separator 2. FIG. 8 is a flowchart of a procedure for separating a mixture of substances, performed by the separator 2.

The separator 2, in which a mixture of substances including a plurality of types of fluids (i.e., gases or liquids) is supplied to the zeolite membrane composite 1, separates a substance with high permeability in the mixture of substances from the mixture of substances by causing the substance to permeate through the zeolite membrane composite 1. For example, the separation by the separator 2 may be conducted for the purpose of extracting a substance with high permeability from the mixture of substances, or for the purpose of condensing a substance with low permeability.

The mixture of substances (i.e., mixed fluid) may be a mixed gas including a plurality of types of gases, or may be a mixed solution including a plurality of types of liquids, or may be a gas-liquid two-phase fluid including both gases and liquids.

The mixture of substances includes, for example, one or more kinds of substances selected from the group consisting of hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrocyanic acid (HCN), carbonyl sulfide (COS), C1 to C8 hydrocarbons, organic acid, alcohol, mercaptans, ester, ether, ketone, and aldehyde.

Nitrogen oxide is a compound of nitrogen and oxygen. The aforementioned nitrogen oxide may, for example, be a gas called NOx such as nitrogen monoxides (NO), nitrogen dioxides ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

Sulfur oxide is a compound of sulfur and oxygen. The aforementioned sulfur oxide may, for example, be a gas called $SO_x$ such as sulfur dioxide ($SO_2$) or sulfur trioxide ($SO_3$).

Sulfur fluoride is a compound of fluorine and sulfur. The aforementioned sulfur fluoride may, for example, be disulfur difluoride (F—S—S—F, S=$SF_2$), sulfur difluoride ($SF_2$), sulfur tetrafluoride ($SF_4$), sulfur hexafluoride ($SF_6$), or disulfur decafluoride ($S_2F_{10}$).

C1 to C8 hydrocarbons are hydrocarbons containing one or more and eight or less carbon atoms. C3 to C8 hydrocarbons each may be any of a linear-chain compound, a side-chain compound, and a cyclic compound. C3 to C8 hydrocarbons each may be either a saturated hydrocarbon (i.e., the absence of a double bond and a triple bond in a molecule) or an unsaturated hydrocarbon (i.e., the presence of a double bond and/or a triple bond in a molecule). C1 to C4 may, for example, be methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The aforementioned organic acid may, for example, be carboxylic acid or sulfonic acid. The carboxylic acid may, for example, be formic acid ($CH_2O_2$), acetic acid ($C_2H_4O_2$), oxalic acid ($C_2H_2O_4$), acrylic acid ($C_3H_4O_2$), or benzoic acid ($C_6H_5COOH$). The sulfonic acid may, for example, be ethane sulfonic acid ($C_2H_6O_3S$). The organic acid may be either a chain compound or a cyclic compound.

The aforementioned alcohol may, for example, be methanol ($CH_3OH$), ethanol ($C_2H_5OH$), isopropanol (2-propanol) ($CH_3CH(OH)CH_3$), ethylene glycol ($CH_2(OH)CH_2(OH)$), or butanol ($C_4H_9OH$).

The mercaptans are organic compounds with terminal sulfur hydride (SH) and are substances called also thiol or thioalcohol. The aforementioned mercaptans may, for example, be methyl mercaptans ($CH_3SH$), ethyl mercaptans ($C_2H_5SH$), or 1-propane thiol ($C_3H_7SH$).

The aforementioned ester may, for example, be formic acid ester or acetic acid ester.

The aforementioned ether may, for example, be dimethyl ether (($CH_3)_2O$), methyl ethyl ether ($C_2H_5OCH_3$), or diethyl ether (($C_2H_5)_2O$).

The aforementioned ketone may, for example, be acetone (($CH_3)_2CO$), methyl ethyl ketone ($C_2H_5COCH_3$), or diethyl ketone (($C_2H_5)_2CO$).

The aforementioned aldehyde may, for example, be acetaldehyde ($CH_3CHO$), propionaldehyde ($C_2H_5CHO$), or butanal (butyraldehyde) ($C_3H_7CHO$).

The following description takes the example of the case where the mixture of substances to be separated by the separator 2 is a mixed gas including a plurality of types of gases.

The separator 2 includes the zeolite membrane composite 1, sealers 21, an outer cylinder 22, seal members 23, a supply part 26, a first collecting part 27, and a second collecting part 28. The zeolite membrane composite 1, the sealers 21, and the seal members 23 are housed in the outer cylinder 22. The supply part 26, the first collecting part 27, and the second collecting part 28 are disposed outside the outer cylinder 22 and connected to the outer cylinder 22.

The sealers 21 are members that are mounted on both ends of the support 11 in the longitudinal direction (i.e., the left-right direction in FIG. 6) and that cover and seal both end faces of the support 11 in the longitudinal direction and the outside surface of the support 11 in the vicinity of the both end faces. The sealers 21 prevent the inflow and outflow of gases from the both end faces of the support 11. The sealers 21 may, for example, be plate-like members formed of glass or a resin. The material and shape of the sealers 21 may be appropriately changed. Since the sealers 21 have a plurality of openings that overlap with the through holes 111 of the support 11, both ends of each through hole 111 of the support 11 in the longitudinal direction are not covered with the sealers 21. This allows the inflow and outflow of gases or the like from the both ends to the through holes 11.

The outer cylinder 22 is a generally cylindrical tube-like member. The outer cylinder 22 may be formed of, for example, stainless steel or carbon steel. The longitudinal direction of the outer cylinder 22 is substantially parallel to the longitudinal direction of the zeolite membrane composite 1. The outer cylinder 22 has a supply port 221 at one end in the longitudinal direction (i.e., the end on the left side in FIG. 1) and a first exhaust port 222 at the other end. The outer cylinder 22 also has a second exhaust port 223 in the side face. The supply port 221 is connected to the supply part 26. The first exhaust port 222 is connected to the first collecting part 27. The second exhaust port 223 is connected to the second collecting part 28. The outer cylinder 22 has an internal space that is an enclosed space isolated from the space around the outer cylinder 22.

The two seal members 23 are arranged around the entire circumference between the outside surface of the zeolite membrane composite 1 and the inside surface of the outer cylinder 22 in the vicinity of the opposite ends of the zeolite membrane composite 1 in the longitudinal direction. Each seal member 23 is a generally ring-shaped member formed of a material that is impermeable to gases. For example, the seal members 23 are O-rings formed of resin having flexibility. In the example illustrated in FIG. 7, the seal members 23 are in tight contact with the outside surfaces of the sealers 21 and are indirectly in tight contact with the outside surface of the zeolite membrane composite 1 via the sealers 21. A space between the seal members 23 and the outside surface of the zeolite membrane composite 1 and a space between the seal members 23 and the inside surface of the outer cylinder 22 are sealed so as to almost or completely disable the passage of gases.

The supply part 26 supplies a mixed gas to the internal space of the outer cylinder 22 through the supply port 221. For example, the supply part 26 may be a blower or pump that transmits the mixed gas toward the outer cylinder 22 under pressure. The blower or pump includes a pressure regulator that regulates the pressure of the mixed gas supplied to the outer cylinder 22. For example, the first collecting part 27 and the second collecting part 28 may be reservoirs that store gases derived from the outer cylinder 22, or may also be blowers or pumps that transfer the gases.

In the case of separating a mixed gas, the aforementioned separator 2 is provided to prepare the zeolite membrane composite 1 (step S21). Then, the supply part 26 supplies a mixed gas to the internal space of the outer cylinder 22, the mixed gas including a plurality of types of gases with different permeability to the zeolite membrane 12. For example, the mixed gas may be composed predominantly of $CO_2$ and $CH_4$. The mixed gas may also include gases other than $CO_2$ and $CH_4$. The pressure of the mixed gas supplied from the supply part 26 to the internal space of the outer cylinder 22 (i.e., supply pressure) may, for example, be in the range of 0.1 MPa to 20.0 MPa. The temperature of separating the mixed gas may, for example, be in the range of 10° C. to 250° C.

The mixed gas supplied from the supply part 26 to the outer cylinder 22 is introduced from the left end of the zeolite membrane composite 1 in the drawing into each through hole 111 of the support 11, as indicated by an arrow 251. A gas with high permeability (e.g., $CO_2$ and hereinafter referred to as a "high-permeability substance") in the mixed gas permeates through the zeolite membrane 12 provided on the inside surfaces of the support 11 and through the support 11, and is then emitted from the outside surface of the support 11. Accordingly, the high-permeability substance is separated from a gas with low permeability (e.g., $CH_4$ and hereinafter referred to as a "low-permeability substance") in the mixed gas (step S22). The gas emitted from the outside surface of the support 11 (hereinafter referred to as a "permeated substance") is collected by the second collecting part 28 through the second exhaust port 223, as indicated by an arrow 253. The pressure (i.e., permeation pressure) of the gas collected by the second collecting part 28 through the second exhaust port 223 may, for example, be approximately one atmospheric pressure (0.101 MPa).

In the mixed gas, a gas other than the gas that has permeated through the zeolite membrane 12 and the support 11 (hereinafter, referred to as a "non-permeated substance") passes through each through hole 111 of the support 11 from the left side to the right side in the drawing, and is collected by the first collecting part 27 through the first exhaust port 222, as indicated by an arrow 252. The pressure of the gas collected by the first collecting part 27 through the first exhaust port 222 may, for example, be substantially the same pressure as the supply pressure. The non-permeated substance may also include a high-permeability substance that has not permeated through the zeolite membrane 12, in addition to the aforementioned low-permeability substance.

Next, the relationship of the structure of the zeolite membrane 12 in the zeolite membrane composite 1, the method of producing the zeolite membrane 12, and the permeability and selectivity of the zeolite membrane composite 1 will be described with reference to Tables 1 and 2. Permeability and Selectivity in Tables 1 and 2 were obtained from a permeated substance (i.e., permeated gas) collected by the second collecting part 28 as a result of a mixed gas of $CO_2$ and $CH_4$ being supplied from the supply part 26 to the zeolite membrane composite 1 in the outer cylinder 22 and caused to permeate through the zeolite membrane composite 1 in the separator 2 described above. The volume fractions of $CO_2$ and $CH_4$ in the mixed gas supplied from the supply part 26 were each assumed to be 50%, and the partial pressures of $CO_2$ and $CH_4$ were each assumed to be 0.3 MPa.

Permeability in Tables 1 and 2 indicates the $CO_2$ permeance ratio obtained based on the permeance of $CO_2$ collected by the second collecting part 28. When the $CO_2$ permeance in Comparative Example 1 is assumed to be 1 in Table 1 and the $CO_2$ permeance in Example 8 is assumed to be 1 in Table 2, the $CO_2$ permeance ratio indicates the ratio of the $CO_2$ permeance in the other examples and comparative examples to the $CO_2$ permeance in the reference example. Selectivity in Tables 1 and 2 indicates the value obtained by dividing the permeance of $CO_2$ collected by the second collecting part 28 by the leakage of $CH_4$ collected by the second collecting part 28 (i.e., $CO_2/CH_4$ permeance ratio).

TABLE 1

| | Thickness of Zeolite Membrane (μm) | Structure of Zeolite Membrane | Compact-Layer Thickness/Low-Density-Layer Thickness | Permeability $CO_2$ Permeance Ratio | Selectivity $CO_2/CH_4$ Permeance Ratio |
| --- | --- | --- | --- | --- | --- |
| Example 1 | 4.5 | Compact Layer Low-Density Layer | 0.04 | 15 | 102 |
| Example 2 | 4.0 | Compact Layer Low-Density Layer | 0.3 | 10 | 203 |
| Example 3 | 4.2 | Compact Layer Low-Density Layer | 1 | 8 | 166 |
| Example 4 | 3.2 | Compact Layer Low-Density Layer | 3 | 7 | 172 |
| Example 5 | 3.0 | Compact Layer Low-Density Layer | 13 | 3 | 163 |
| Example 6 | 2.0 | Compact Layer Low-Density Layer | 20 | 10 | 204 |
| Example 7 | 3.0 | Compact Layer Low-Density Layer | 60 | 1.3 | 231 |
| Comparative Example 1 | 3.0 | Compact Layer | — | 1 (Reference) | 161 |
| Comparative Example 2 | 3.0 | Low-Density Layer | — | 67 | 11 |

In Examples 1 to 7 shown in Table 1, the zeolite membranes 12 each included the low-density layer 13 and the compact layer 14. Examples 1 to 7 differed in the ratio of the thickness of the compact layer 14 to the thickness of the low-density layer 13. In Examples 2 to 6, the thicknesses of the compact layers 14 were in the range of 0.05 times to 50 times the thickness of the low-density layer 13. In Comparative Example 1, the zeolite membrane included only a compact layer and did not include a low-density layer. In Comparative Example 2, the zeolite membrane included only a low-density layer and did not include a compact layer. The zeolite membranes 12 in Examples 1 to 7 had thicknesses of 2 μm to 5 μm. The zeolite membranes in Comparative Examples 1 and 2 had a thickness of 3 μm. In Example 5, the compact layer 14 had an average particle diameter of 0.5 μm, and the low-density layer 13 had an average particle diameter of 0.05 μm. In Example 8, the compact layer 14 had an average particle diameter of 0.2 μm, and the low-density layer 13 had an average particle diameter of 0.05 μm. In Example 10, the compact layer 14 had an average particle diameter of 0.4 μm, and the low-density layer 13 had an average particle diameter of 0.1 μm. In Example 5, the content of a crystalline layer in the compact layer 14 was 99%, and the content of a crystalline layer in the low-density layer 13 was 51%. In Examples 8 to 10, the contents of a crystalline layer in the compact layers 14 were in the range of 96 to 98%, and the contents of a crystalline layer in the low-density layers 13 were in the range of 59 to 80%. In Comparative Example 1, the content of a zeolite crystalline phase in the zeolite membrane was 98%. In Comparative Example 2, the content of a zeolite crystalline phase in the zeolite membrane was 90%.

In Examples 1 to 7 in which the $CO_2$ permeance ratios were in the range of 1.3 to and the $CO_2/CH_4$ permeance ratios were in the range of 102 to 231, the zeolite membranes exhibited high permeability and high selectivity. In particular, in Examples 2 to 6 in which the $CO_2$ permeance ratios were in the range of 3 to 10 and the $CO_2/CH_4$ permeance ratios were in the range of 163 to 204, the zeolite membranes favorably exhibited high permeability and high selectivity. On the other hand, in Comparative Example 1 in which the $CO_2$ permeance ratio was 1, the zeolite membrane exhibited lower permeability than in Examples 1 to 7. In Comparative Example 2 in which the $CO_2/CH_4$ permeance ratio was 11, the zeolite membrane exhibited lower selectivity than in Examples 1 to 7.

of seed crystals were deposited on the support 11 in step S12 during the production of the zeolite membrane 12. In step S13, different values were used for the molar ratio of the SDA to the water contained in the starting material solution. The zeolite membrane 12 became thinner with decreasing molar ratio. The zeolite membrane 12 included the low-density layer 13 and the compact layer 14. In Examples 8 to 10 in which the $CO_2$ permeance ratios were in the range of 1 to 1.8 and the $CO_2/CH_4$ permeance ratios were in the range of 181 to 194, the zeolite membranes exhibited high permeability and high selectivity.

In Comparative Example 3, a single layer of seed crystals (i.e., seed crystals that are not laminated) was deposited on the support during the production of the zeolite membrane. The molar ratio of the SDA to the water contained in the starting material solution was set to be the same as that in Example 8. In Comparative Example 3, the zeolite membrane included only a compact layer and did not include a low-density layer. In Comparative Example 3, the $CO_2$ permeance ratio was 0.2, and the zeolite membrane exhibited lower permeability than in Examples 8 to 10.

As described above, the zeolite membrane composite 1 includes the porous support 11 and the zeolite membrane 12 formed on the support 11. The zeolite membrane 12 includes the low-density layer 13 that covers the support 11, and the compact layer 14 that covers the low-density layer 13. The compact layer 14 has a higher content of a zeolite crystalline phase than the low-density layer 13. By in this way forming the compact layer 14 on the low-density layer 13 that covers the support 11, it is possible to form the thin compact layer 14 with no defects more easily than in the case where the compact layer is directly formed on the support. As a result, it is possible to achieve the zeolite membrane composite 1 with high permeability and high selectivity.

As described above, the zeolite crystals 141 contained in the compact layer 14 preferably have an average particle diameter greater than the average particle diameter of the zeolite crystals 131 contained in the low-density layer 13. By in this way causing the zeolite crystals 141 to grow large in the compact layer 14, it is possible to favorably increase the content of the zeolite crystalline phase in the compact layer 14.

More preferably, the zeolite crystals 141 contained in the compact layer 14 have an average particle diameter that is 100 times or less the average particle diameter of the zeolite crystals 131 contained in the low-density layer 13. This

TABLE 2

|  | Production Method | | Thickness of Zeolite | Structure of | Permeability $CO_2$ | Selectivity $CO_2/CH_4$ |
| --- | --- | --- | --- | --- | --- | --- |
|  | Seed Crystals | Molar Ratio of SDA | Membrane (μm) | Zeolite Membrane | Permeance Ratio | Permeance Ratio |
| Example 8 | Seed Crystal Laminate | 0.00072 | 3.0 | Compact Layer Low-Density Layer | 1 (Reference) | 194 |
| Example 9 | Seed Crystal Laminate | 0.00021 | 2.4 | Compact Layer Low-Density Layer | 1.7 | 181 |
| Example 10 | Seed Crystal Laminate | 0.00009 | 1.8 | Compact Layer Low-Density Layer | 1.8 | 206 |
| Comparative Example 3 | Single Layer | 0.00072 | 3.0 | Compact Layer | 0.2 | 162 |

In Examples 8 to 10 shown in Table 2, the seed crystal laminate 125 including a lamination of two or more layers allows both the permeability and selectivity of the zeolite membrane composite 1 to fall within favorable ranges.

As described above, the zeolite crystals 141 contained in the compact layer 14 preferably have an average particle diameter greater than or equal to 0.1 µm and less than or equal to 10 µm. This allows both the permeability and selectivity of the zeolite membrane composite 1 to fall within favorable ranges.

As described above, the thickness of the compact layer 14 is preferably greater than or equal to 0.05 times and less than or equal to 50 times the thickness of the low-density layer 13. Accordingly, the thin compact layer 14 with no defects can be favorably formed on the low-density layer 13. As a result, it is possible to favorably achieve the zeolite membrane composite 1 with high permeability and high selectivity.

In the zeolite membrane composite 1, the content of the zeolite crystalline phase in the compact layer 14 is preferably higher than or equal to 95%, and the content of the zeolite crystalline phase in the low-density layer 13 is preferably higher than or equal to 5% and lower than 95%. Accordingly, it is possible to favorably achieve the zeolite membrane composite 1 with high permeability and high selectivity.

As described above, the grain boundary phases in the low-density layer 13 are preferably formed of inorganic compounds. In general, inorganic compounds have, for example, higher corrosion resistance (e.g., resistance to water or an organic solvent), higher pressure resistance, and higher heat resistance than organic compounds. Therefore, if the grain boundary phases are substantially made not to include organic compounds, it is possible to give the low-density layer 13 greater durability (e.g., corrosion resistance, heat resistance, and pressure resistance). As a result, it is possible to improve the durability of the zeolite membrane 12.

The grain boundary phases in the low-density layer 13 preferably include an amorphous phase. This reduces stress caused by a difference in thermal expansion between zeolite crystals of different crystalline orientations and thereby suppresses the occurrence of damage to the zeolite membrane 12, such as cracks, during heating of the zeolite membrane 12 (e.g., heat treatment during the production of the zeolite membrane composite 1). That is, it is possible to further improve the durability of the zeolite membrane 12. The amorphous phase included in the grain boundary phases in the low-density layer 13 are preferably 10% or more by weight.

As described above, the compact layer 14 and the low-density layer 13 preferably contain zeolite crystals of the same type. This simplifies the production of the zeolite membrane 12 and consequently simplifies the production of the zeolite membrane composite 1.

As described above, the zeolite crystals 141 contained in the compact layer 14 preferably have a maximum number of 8-membered rings. This favorably allows selective permeation of a target substance with relatively small molecular diameters in the zeolite membrane composite 1.

As described above, the method of producing the zeolite membrane composite 1 includes the step of preparing seed crystals (step S11), the step of depositing the seed crystals on the porous support 11 to form the seed crystal laminate 125 that includes a lamination of two or more layers of the seed crystals on the support 11 (step S12), and the step of immersing the support 11 in the starting material solution to grow a zeolite from the seed crystal laminate 125 by hydrothermal synthesis and to form the zeolite membrane 12 on the support 11 (step S13). The zeolite membrane 12 includes the low-density layer 13 that covers the support 11, and the compact layer 14 that covers the low-density layer 13. The compact layer 14 has a higher content of a zeolite crystalline phase than the low-density layer 13. Accordingly, it is possible to readily produce the zeolite membrane composite 1 with high permeability and high selectivity.

In the method of producing the zeolite membrane composite 1, the molar ratio of the SDA to the water contained in the starting material solution is preferably lower than or equal to 0.01. By in this way causing the seed crystals to be laminated in two or more layers and keeping low the molar ratio of the SDA to the water, it is possible to favorably obtain the zeolite membrane 12 that includes the compact layer 14 and the low-density layer 13. It is also possible to reduce the thickness of the zeolite membrane 12 to be formed on the support 11.

The separation method described above includes the step of preparing the zeolite membrane composite 1 (step S21) and the step of supplying a mixture of substances including a plurality of types of gases or liquids to the zeolite membrane composite 1 and causing a substance with high permeability in the mixture of substances to permeate through the zeolite membrane composite 1 so that the substance with high permeability is separated from the other substances (step S22). As described above, since the zeolite membrane composite 1 has high permeability and high selectivity, this separation method enables efficient separation for a mixture of substances.

The separation method is in particular suitable for use in the separation of a mixture of substances including one or more types of the following substances: hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, $C_1$ to $C_8$ hydrocarbons, organic acid, alcohol, mercaptans, ester, ether, ketone, and aldehyde.

The zeolite membrane composite 1, the method of producing the zeolite membrane composite 1, and the separation method, which are described above, may be modified in various ways.

For example, the maximum number of membered rings in the compact layer 14 of the zeolite membrane 12 may be less than 8 or may be greater than 8. The same applies to the maximum number of membered rings in the low-density layer 13 of the zeolite membrane 12.

The components of the grain boundary phases in the low-density layer 13 may be modified in various ways. For example, the grain boundary phases in the low-density layer 13 may be composed of only an amorphous phase. Alternatively, the grain boundary phases do not necessarily have to include an amorphous phase. The grain boundary phases may include crystals other than zeolite crystals, or do not necessarily have to include crystals. The grain boundary phases do not necessarily have to be composed of only an inorganic compound, and may include an organic compound.

The thickness of the zeolite membrane 12 is not limited to the ranges described above, and may be modified in various ways. The thickness of the compact layer 14 may be greater than 50 times the thickness of the low-density layer 13, or may be less than 0.05 times the thickness of the low-density layer 13.

The average particle diameter of zeolite crystals contained in the compact layer 14 and the low-density layer 13 may be modified in various ways. For example, the average particle diameter of the zeolite crystals contained in the compact layer 14 may be less than 0.1 µm, or may be greater than 10 µm. The average particle diameter of the zeolite crystals contained in the compact layer 14 may also be greater than 100 times the average particle diameter of the zeolite crystals contained in the low-density layer 13. Alternatively, the average particle diameter of the zeolite crystals contained in the compact layer 14 may be less than or equal to the average particle diameter of the zeolite crystals contained in the low-density layer 13.

The content of the zeolite crystalline phase in the compact layer 14 may be less than 95% as long as it is higher than the content of the zeolite crystalline phase in the low-density layer 13.

In the zeolite membrane 12, the zeolite crystals contained in the compact layer 14 may be zeolite crystals of a type different from the type of the zeolite crystals contained in the low-density layer 13.

The zeolite membrane composite 1 may further include a functional membrane or a protective membrane that is laminated on the zeolite membrane 12, in addition to the support 11 and the zeolite membrane 12. Such a functional or protective membrane may be an inorganic membrane such as a zeolite membrane, a silica membrane, or a carbon membrane, or may be an organic membrane such as a polyimide membrane or a silicone membrane. Moreover, a substance that can easily absorb $CO_2$ may be added to the functional or protective membrane that is laminated on the zeolite membrane 12.

In the separator 2 and the separation method, substances other than those exemplified in the above description may be separated from a mixture of substances.

The constitutions of the above-described preferred embodiments and the variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The zeolite membrane composite according to the present invention is, for example, applicable as a gas separation membrane, or may be applicable in various fields using the zeolite as a separation membrane for separating a substance other than gases or as an absorbent membrane for absorbing various substances.

REFERENCE SIGNS LIST

1 Zeolite membrane composite
11 Support
12 Zeolite membrane
13 Low-density layer
14 Compact layer
131 Zeolite crystals (in low-density layer)
141 Zeolite crystals (in compact layer)
S11 to S13, S21 to S22 Step

The invention claimed is:
1. A zeolite membrane composite comprising:
a porous support; and
a zeolite membrane formed on said support;
wherein said zeolite membrane includes:
a low-density layer that covers said support; and
a compact layer that covers said low-density layer and has a higher content of a zeolite crystalline phase than said low-density layer;
wherein said compact layer contains zeolite crystals with an average particle diameter greater than an average particle diameter of zeolite crystals contained in said low-density layer.

2. The zeolite membrane composite according to claim 1, wherein
the average particle diameter of the zeolite crystals contained in said compact layer is 100 times or less the average particle diameter of the zeolite crystals contained in said low-density layer.

3. The zeolite membrane composite according to claim 1, wherein
said compact layer contains zeolite crystals with an average particle diameter greater than or equal to 0.1 μm and less than or equal to 10 μm.

4. The zeolite membrane composite according to claim 1, wherein
said compact layer has a thickness that is 0.05 times or more and 50 times or less a thickness of said low-density layer.

5. The zeolite membrane composite according to claim 1, wherein
the content of the zeolite crystalline phase in said compact layer is higher than or equal to 95%, and
a content of a zeolite crystalline phase in said low-density layer is higher than or equal to 5% and lower than 95%.

6. The zeolite membrane composite according to claim 1, wherein
said low-density layer has a grain boundary phase formed of an inorganic compound.

7. The zeolite membrane composite according to claim 1, wherein
said low-density layer has a grain boundary phase including an amorphous phase.

8. The zeolite membrane composite according to claim 1, wherein
said compact layer and said low-density layer contain zeolite crystals of the same type.

9. The zeolite membrane composite according to claim 1, wherein
said compact layer contains zeolite crystals having a maximum number of 8-membered rings.

10. The zeolite membrane composite according to claim 1, wherein a thickness of said low-density layer is in the range of 0.1 μm to 20 μm, the thickness of said low-density layer is obtained as an average distance between an interface and an approximate surface of said support in a direction perpendicular to an approximate surface of said compact layer, said interface being the interface between said compact layer and said low-density layer.

11. A method of producing the zeolite membrane composite according to claim 1, comprising:
a) preparing seed crystals;
b) depositing said seed crystals on a porous support to form a seed crystal laminate on said support, said seed crystal laminate including a lamination of two or more layers of said seed crystals; and
c) immersing said support in a starting material solution to grow a zeolite from said seed crystal laminate by hydrothermal synthesis and to form a zeolite membrane on said support,
wherein said zeolite membrane includes:
a low-density layer that covers said support; and
a compact layer that covers said low-density layer and has a higher content of a zeolite crystalline phase than said low-density layer.

12. The method of producing the zeolite membrane composite according to claim 11, wherein
a molar ratio of a structure-directing agent to water in said starting material solution is less than or equal to 0.01.

13. A separation method comprising:
a) preparing the zeolite membrane composite according to claim 1; and
b) supplying a mixture of substances that includes a plurality of types of gases or liquids to said zeolite membrane composite and causing a substance with high permeability relative to other substances in said mixture of substances to permeate through said zeolite membrane composite to separate said substance with high permeability from the other substances.

14. The separation method according to claim 13, wherein said mixture of substances includes at least one of substances selected from a group consisting of hydrogen, helium, nitrogen, oxygen, water, steam, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

* * * * *